Patented Sept. 24, 1929

1,729,543

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF CRUDE AROMATIC HYDROCARBONS

No Drawing. Original application filed April 12, 1926, Serial No. 101,561. Divided and this application filed October 11, 1927. Serial No. 225,601.

This invention relates to the purification of crude aromatic hydrocarbons, and more particularly, to the purification of light distillates from coal and oil tar and light oils condensed from coal gas.

Crude coal or oil tar distillates are usually washed with dilute acid and with alkali to remove bases and acid compounds such as phenols, followed by repeated washing with small amounts of concentrated sulfuric acid. This process is open to many objections. In the first place, while sulfuric acid removes some unsaturated compounds fairly well, many acyclic compounds such as paraffins and $CS_2$ besides other sulfur compounds, alicyclic compounds and heterocyclic compounds such as thiophenes are not removed or are only partially removed. The resulting commercial hydrocarbons such as commercial benzene, toluene, xylene, solvent naptha, etc., are not sufficiently pure for many purposes.

It is possible to obtain highly purified hydrocarbons by the use of a sufficiently large amount of sulfuric acid and oleum but the losses of hydrocarbons are so high as to render the process commercially impracticable. A further drawback lies in the fact that the sludge which contains acid resins and other impurities is frequently considerably decomposed by the acid and is therefore of little or no value.

In my co-pending application, Serial No. 86,099, filed February 4, 1926, I have described and claimed a method of purifying crude aromatic hydrocarbons by selective halogenation whereby the impurities are changed into compounds having boiling points for the most part considerably above that of aromatic hydrocarbons and in the case of carbon disulfide into carbon tetrachloride which is harmless for most purposes owing to its great chemical inertness. I have also described the use of various halogen carriers, such as iodine, bromine, sulfur compounds, metal chlorides, compounds of antimony and the like. In this application, I have further described the production of sludges which consist in large part of halogen bodies and can be used as a raw material for obtaining solvents and other useful bodies, whereas sludges produced by sulfuric acid wash are for the most part worthless.

The present invention consists in the combination of the features of acid washing and selective halogenation in the vapor phase and possesses the advantages of both processes, at the same time increasing the efficiency of each.

While retaining all of the advantages of the acid wash process such as cheapness and the like, the present invention produces sludges of as high quality as those described in my co-pending application, above referred to, and from which sludges many valuable products, such as solvents, light colored resins, such as cumaron and indene resins, and the like are produced. In addition, the sulfuric acid wash may actually increase the effectiveness of the halogenation treatment. A further advantage consists in the fact that it is possible to remove certain undesirable and worthless products by means of sulfuric acid so that when the partially purified distillate is treated with halogen, the resulting halogenated products which are later separated by distillation are free from the undesired products which have been removed by the sulfuric acid and are accordingly more suited to commercial utilization and constitute more valuable products. The sequence of treatments with acid and halogen according to the present invention can be most varied. Thus, the distillates can be freed from phenols and bases by treatment with alkali and dilute acid and then given one or more washes with concentrated sulfuric acid followed by treatment with halogen. In certain other cases, it may be desirable to treat first with halogen and then wash with acid. This may be desirable where certain easily attacked impurities are desired in the form of halogenated or halogen treated products. Halogenation may be employed immediately after the removal of bases from the distillates by the dilute acid and in such cases, excellent aromatic hydrocarbons can be obtained after the distillation and the impurities, particularly in the case of benzols, from a valuable mixture which can be used as a solvent or for other purposes. The aromatic hydrocarbons, of course, are free from many of the impurities which are not removed by ordinary sulfuric acid wash and also are free from carbon disulfide which has been transformed into carbon tetrachloride or other harmless products.

When the halogen treatment is preceded by one or more concentrated sulfuric acid washes, some unsaturated compounds are first attacked and removed, and as has been pointed out above, the impurities which are removed after halogenation are not contaminated with some of the unsaturated products and are thus a more homogeneous and more useful product which is particularly desirable when the product is to be used as a solvent. The aromatic hydrocarbon fractions which are obtained are entirely similar to those obtained by the halogen treatment without sulfuric acid wash, and, of course, are characterized by the same high grade of purity and substantial absence of impurities which interfere with their use in catalytic reactions.

The preliminary treatment with the sulfuric acid is particularly desirable in the case of heavier distillates such as solvent naptha and the like as these distillates contain not only resin forming bodies like cumaron and indene, but also other unsaturated alifatic compounds which are non-resin forming and which are easily attacked by sulfuric acid. These products are removed by the acid wash and the following halogenating process removes the last traces of alifatic compounds or undesirable alicyclic compounds such as cyclopentadiene and dicyclopentadiene. Heterocyclic compounds such as the thiophenes are also removed together with styrol and to a certain extent hydrindene which are transformed into high boiling halogenated products. The solvent naptha or heavy solvent fractions are removed by distillation and the reduction or elimination of sulfuric acid washing prevents undesired polymerization of the cumarons and indenes present. The solvent naptha thus provisionally purified can be subjected to conditions which favor polymerization and the resinophores polymerize to form high grade resins of very light color. The aromatic hydrocarbons can be distilled off and are obtained in a high state of purity. The yields of resins and aromatic hydrocarbons are very high.

By combining the sulfuric acid wash process with the halogenation process, it is possible to remove the undesired impurities in precisely the form in which they best can be used. Thus, certain impurities which are desired in a polymerized form can be removed by sulfuric acid, whereas other products which are desired in the form of halogenated bodies can be removed by the halogenating treatment. The combined process removes in the most satisfactory manner, all of the undesired impurities or transforms them into harmless products. In this manner, light oil fractions can be purified by removing alifatic hydrocarbons such as pentane, hexane, amylene, hexylene, heptylene, octylene, alicyclic compounds such as cyclopentadiene, dicyclopentadine, di- and tetrahydrobenzene, hydrindene and the like, heterocyclic compounds such as pyrrol, pyridine, thiophene, thiotolene, thioxene, and the like. Other sulfur compounds particularly carbon disulfide which may be present in the crude fractions are attacked by halogen and are transformed into other compounds such as carbon tetrachloride in the case of carbon disulfide. The presence of carbon tetrachloride in aromatic hydrocarbons is practically harmless as this compound is so indifferent that it does not interfere with the use of the hydrocarbons in catalytic processes or for the production of intermediates to be used in catalytic processes particularly reductions and hydrogenations.

The aromatic hydrocarbons produced by the present process are thus practically free from sulfur and are in a state of high purity.

The halogenation of the partially washed crude distillates or condensates may be effected by chlorine, or by bromine, but I have found that iodine is not active and accordingly the expression "active halogen" which will be used hereafter in the specification and claims is intended to include chlorine and bromine, but to exclude iodine. It should be noted, however, that iodine is an excellent halogen carrier, particularly for the halogenation of carbon disulfide. The halogenation may be effected by the use of elementary halogen such as chlorine, gaseous or liquid, or bromine or solutions such as chlorine or bromine water, bodies yielding chlorine or bromine, such as aqua regia, phosgene, sulfuryl chloride, nitrosyl chloride, hypochlorites, hypobromites, chlorides or hydrochloric acid in the presence of oxidizers and the like.

Sulphur or sulfur compounds such as sulfur halides, sulfuryl chloride, thionylchloride, benzene sulfochloride and homologues, are preferably used single or together as halogen carriers as they preferentially catalyze the halogenation and particularly the chlorination of acyclic, alicyclic, heterocyclic compounds while having but little effect on the halogenation of aromatic hydrocarbons. Nitrosylchloride may also be used.

The following halogen carriers may also be used singly or together; iron, ferric chloride or bromide, aluminum, aluminum halides, halides of antimony, tin, gold, tellurium, zirconium, uranium, vanadium, bismuth, molybdenum, zinc, copper, and nickel compounds, animal charcoal, wood charcoal or any other well known halogen carriers. The reaction may also be advantageously carried out in the presence of light, heat or silent electric discharge. Combinations of the chemical mixtures enumerated above and the physical catalysts such as light, heat and the like may be used.

The chlorination of carbon disulfide is particularly accelerated by iodine, bromine, metallic chlorides, aluminum chloride, aluminum turnings, ferric chloride, iron scale, iron sesquioxide, iron sulfide, ferrous carbonate, ferrous sulfate, antimony, either in the form of powdered metal, oxide or chloride. Chemical compounds of the catalysts which preferentially catalyze the halogenation of the several classes of impurities may also be used.

The carriers may be added before or during halogenation or may be formed in halogenation, for example, sulfurylchloride which acts as chlorinating agent and carrier at the same time. Other combinations are also possible.

Unremoved sulfuric acid and hydrochloric acid formed during chlorination may be neutralized by adding suitable substances before, during or after chlorination. Examples of neutralizing substances are soda ash, caustic alkalies, lime, slaked and unslaked, calcium carbonate, magnesia, ammonia and similar substances.

The purification by halogenation may be carried out in anhydrous vapor phase by adding suitable driers such as anhydrous calcium chloride or copper sulfate, quick lime, etc.

The halogenation in vapor phase, may also be carried out in the presence of steam or water. In most cases the action of steam or water is to dilute the chlorine or chlorinating agent and there is also a strong tendency to prevent undesired condensation or polymerization. This latter feature may be of considerable importance where large amounts of resinifiable substances are present, as in crude solvent benzene and it is desired to prevent or retard condensation. The use of water or steam in vapor phase purification also aids in washing the distillate if allowed to condense with it or in the case of higher boiling hydrocarbons a more complete separation may be brought about by maintaining the condenser above the boiling point of water. In vapor phase purifications the steam may be introduced wholly into the liquid phase or into the vapor phase or partly in one and partly in the other. Chlorine and steam may be introduced together or separately. The steam may be wet or superheated and may be at about the boiling temperature of the mixture or may be at a much higher temperature and serve partly or wholly as the heating means.

The sequence of treatment with acid and with halogen, the numbers and intensities of treatments, of course, will vary with the products treated and with the use of which the impurities are to be put. I have outlined certain general principles guiding the choice of procedure and these principles will be further illustrated in the specific examples. The invention is, however, not limited to the details therein set forth and in any particular case, the skilled chemist will be guided in his choice of procedure by the conditions of the particular distillate or condensate with which he is working.

*Example 1*

A low boiling crude benzene fraction containing 2–3% of toluene and the usual impurities is freed from phenols and bases in the usual manner by means of alkali and sulfuric acid. The product is then treated with 0.2 to 0.5% by volume of 65–66° Bé. sulfuric acid with vigorous agitation. The agitation is continued for 10–15 minutes, care being taken that the oil does not become too warm. The mixture is then allowed to settle and the tar acid which settles out in about 10 minutes is drawn off. After another 10 minutes, a further portion of the acid will have settled out and is also drawn off, whereupon the oil is washed with cold or warm water. The product is distilled in a column and gaseous chlorine is introduced into the bottom of the column, the rate of introduction being regulated so that the distillate after washing, gives no color with the standard sulfuric acid test. The distillate can be collected and washed with water or dilute alkali or the vapor may be condensed in a wash tower or the hydrochloric acid formed may be removed in any other suitable manner. The process can be made a continuous one by adding fresh amounts of crude benzene to the still and removing the chlorinated impurities from the bottom of the still through a drain pipe. The chlorinated toluene may be recovered from the waste sludge when it is present in sufficient amount to warrant recovery. The other components of the sludge may also be utilized as described in the examples above. A yield of highly purified benzene from 97 to 99% of the theory is obtainable and is not only substantially free from sulfur compounds but is also relatively free from toluene.

*Example 2*

A low boiling crude benzene fraction containing from 2 to 5% of toluene and the other usual impurities is treated as described in Example 1. In addition to the chlorine, however, a small amount of sulfur dioxide is introduced into the column as a gaseous catalyst. The sulfur dioxide and chlorine react to form sulfuryl chloride which strongly catalyzes the chlorination of the impurities and permits a considerable increase in output from the same apparatus. The sulfuryl chloride boils at a relatively high temperature and tends to flow back into the still where it is removed with the waste sludge.

Small amounts of unreacted sulfur dioxide may at times pass off into the distillate but can be readily removed with an alkaline wash.

*Example 3*

A low boiling crude benzene fraction is purified as described in Examples 1 and 2. The still column is filled with iron fragments as a catalyst. The purification is very rapid but care should be taken not to use more chlorine than that required to combine with the impurities and with the toluene, as in the presence of sufficient chlorine iron catalyzes the chlorination of benzene itself.

In the claims, the expression, "coal tar distillate," is used to cover not only true distillates from coal tar, but also mixtures of similar chemical composition containing aromatic hydrocarbons and acyclic, alicyclic and heterocyclic impurities such as condensates from coal gas, benzol plant residues and the like.

This application is a division of my copending application Serial No. 101,561, filed April 12, 1926.

What is claimed as new is:

1. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity and thereupon subjecting the partially purified mixture to selective halogenation with an amount of active halogen sufficient to react with substantially all of the impurities but insufficient to effect substantial nuclear halogenation of the aromatic hydrocarbons, the selective halogenation taking place in the vapor phase.

2. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity and thereupon subjecting the partially purified mixture to selective halogenation with an amount of active halogen sufficient to react with substantially all of the impurities but insufficient to effect substantial nuclear halogenation of the aromatic hydrocarbons, the selective halogenation taking place in the vapor phase by means of gaseous halogen in the presence of a solid halogen carrier.

3. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity and thereupon subjecting the partially purified mixture to selective halogenation with an amount of active halogen sufficient to react with substantially all of the impurities but insufficient to effect substantial nuclear halogenation of the aromatic hydrocarbons, the selective halogenation being carried out in the vapor phase under conditions and in the presence of re-agents which favor side chain halogenation.

4. The method of preparing purified hydrocarbons which comprises distilling a mixture of aromatic hydrocarbons containing acyclic, alicyclic and heterocyclic impurities which has been subjected to treatment with an amount of strong sulfuric acid insufficient to purify the mixture to a commercial product of the customary purity, passing the vapors through a reflux column, introducing gaseous active halogenating agents into the column in amount sufficient to react with the impurities in the vapor but insufficient to effect substantially nuclear halogenation of the aromatic hydrocarbons, the halogen reacted impurities of high boiling point being permitted to flow back into the still and being continuously removed therefrom.

5. The process according to claim 4 in which gaseous active halogenating agent is diluted with substantially inert gaseous material.

6. The method of producing purified aromatic hydrocarbons which comprises subjecting an aromatic hydrocarbon mixture containing acyclic, alicycle and heterocyclic impurities to the action of an amount of strong sulfuric acid insufficient to purify the mixture to a commercial product of the customary purity and thereupon subjecting the partially purified mixture to selective halogenation with an amount of active halogen sufficient to react with substantially all of the impurities but insufficient to effect substantial nuclear halogenation of the aromatic hydrocarbons, the selective halogenation taking place in the vapor phase in the presence of steam.

7. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity and thereupon subjecting the partially purified mixture to selective halogenation with an amount of active halogen sufficient to react with substantially all of the impurities but insufficient to effect substantial nuclear halogenation of the aromatic hydrocarbons, the selective halogenation taking place in both vapor and liquid phase.

8. The process according to claim 4 in which the selective halogenation takes place in the presence of steam, at least part of the heat required for distilling the mixture being supplied by the steam.

9. The process according to claim 4 in which the active halogenation takes place in the presence of sufficient steam to pass over with the purified vapors and condensing the vapors at a temperature below the boiling point of water whereby the steam present condenses and separating the water from the purified aromatic hydrocarbon distillate.

Signed at Pittsburgh, Pennsylvania, this 7th day of October, 1927.

ALPHONS O. JAEGER.